（12) United States Patent
Varghese et al.

(10) Patent No.: US 9,140,853 B2
(45) Date of Patent: Sep. 22, 2015

(54) ALL SILICON OPTICAL TRANSISTOR

(71) Applicant: PURDUE RESEARCH FOUNDATION, West Lafayette, IN (US)

(72) Inventors: Leo Tom Varghese, West Lafayette, IN (US); Minghao Qi, West Lafayette, IN (US); Li Fan, West Lafayette, IN (US); Jian Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 14/400,231

(22) PCT Filed: Oct. 15, 2012

(86) PCT No.: PCT/US2012/060320
§ 371 (c)(1),
(2) Date: Nov. 10, 2014

(87) PCT Pub. No.: WO2013/169286
PCT Pub. Date: Nov. 14, 2013

(65) Prior Publication Data
US 2015/0098674 A1    Apr. 9, 2015

Related U.S. Application Data

(60) Provisional application No. 61/644,731, filed on May 9, 2012.

(51) Int. Cl.
*G02B 6/12* (2006.01)
*G02F 1/01* (2006.01)
(Continued)

(52) U.S. Cl.
CPC .......... *G02B 6/12007* (2013.01); *G02B 6/4295* (2013.01); *G02F 1/0147* (2013.01);
(Continued)

(58) Field of Classification Search
CPC G02B 6/12007; G02B 6/4295; G02F 1/0147; G02F 1/025
See application file for complete search history.

(56) References Cited

U.S. PATENT DOCUMENTS 6,009,115 A * 12/1999 Ho .................................. 372/92
7,065,276 B2 * 6/2006 Scheuer et al. ................. 385/50
(Continued)

FOREIGN PATENT DOCUMENTS

KR    1020010012730 A    2/2001
KR       100796258 B1    1/2008

OTHER PUBLICATIONS

Li Fan et al., "An All-Silicon Passive Optical Diode", Science, Jan. 27, 2012, pp. 447-450, vol. 335, No. 6067.*
International Search Report and Written Opinion for PCT/US2012/0600320, ISA/KR, Mar. 29, 2013.

*Primary Examiner* — Daniel Petkovsek
(74) *Attorney, Agent, or Firm* — Maginot, Moore & Beck LLP (57) ABSTRACT

An optical device includes first and second waveguides and a micro-ring. The first waveguide is optically coupled to the micro-ring and is separated from the micro-ring by a first gap having a first gap distance. The second waveguide has a supply port, an output port, and a coupling portion optically coupled to the micro-ring. The coupling portion is separated from the micro-ring by a second gap having a second distance. The second gap distance is larger than the first gap distance. The second waveguide and the micro-ring cooperate to form a filter having a stop band. The first gap distance is selected such that a first optical signal on the first waveguide having a first strength causes a first shift in the stop band such that a first wavelength is within the stop band, and wherein the second gap distance is selected such that a second optical signal on the second waveguide having the first strength causes a second or no shift in the stop band such that the first wavelength is outside of the stop band.

20 Claims, 4 Drawing Sheets

(51) Int. Cl.
  *G02F 1/025*   (2006.01)
  *G02B 6/42*    (2006.01)
  *G02B 6/293*   (2006.01)

(52) U.S. Cl.
  CPC ............ *G02F 1/025* (2013.01); *G02B 6/29341* (2013.01); *G02B 2006/12097* (2013.01); *G02F 2201/16* (2013.01); *G02F 2202/105* (2013.01); *G02F 2203/15* (2013.01)

(56) References Cited

U.S. PATENT DOCUMENTS

| | | | |
|---|---|---|---|
| 7,292,751 B2 * | 11/2007 | Popovic | 385/32 |
| 7,400,798 B2 | 7/2008 | De Almeida | |
| 8,300,997 B2 * | 10/2012 | Chao et al. | 385/32 |
| 2004/0008948 A1 | 1/2004 | Chin | |
| 2006/0171635 A1 | 8/2006 | Lee | |
| 2015/0049982 A1 * | 2/2015 | Qi et al. | 385/14 |

\* cited by examiner

ALL SILICON OPTICAL TRANSISTOR

The present application claims the benefit of U.S. Provisional Patent Application Ser. No. 61/644,731, filed May 9, 2012, which is incorporated herein by reference.

FIELD OF THE INVENTION

The present invention relates generally to optical signal processing, and more particularly, for devices used in transmitting and/or processing optical signals.

BACKGROUND

An optical transistor is an optical device for use in optical circuits that has the characteristics analogous to those of an electrical transistor. For example, an optical transistor may have three terminals or ports analogous to the three terminals of a common BJT or FET transistor. In general, a transistor-type device has the general characteristic of allowing a relatively weak input signal to control a stronger output signal. In an FET, a gate signal with very little current may be used to switch much larger currents.

The ability to allow a weak signal to switch a strong signal is known as the supply-gate ratio ("SGR"). A transistor having a good SGR (for example, a FET or BJT) can be used as a repeater in a transmission line, for example. Another important feature of a transistor is its on/off ratio. The on/off ratio measures the difference in output (e.g. drain-source) current from the on state (conducting) to the off state (non-conducting). This is sometimes known as the blocking characteristic.

In general, an ideal optical transistor would have a good optical SGR and on/off ratio. Such an optical transistor would be useful in all-optical information processing. While optical transistors have been realized, they have only been realized in non-silicon chip environments. Such devices are difficult to incorporate into integrated optical circuits.

There is a need, therefore, for an optical device that operates in the manner of an electrical transistor, but can be implemented in a silicon chip environment that is suitable for integration with other components.

SUMMARY

The present invention addresses the above described need, as well as others, by providing a optical device that uses asymmetrical coupling between an optical cavity (such as a resonator) and two light guides. The resulting device can operate in a manner analogous to that an electrical transistor. One of the light guides includes a first port analogous to a gate, while the other light guide includes a supply port and output port analogous to a drain and a source.

In particular, a first embodiment is an optical device that includes an optical cavity, a first light guide and a second light guide, all formed or disposed on a semiconductor substrate. The first light guide is optically coupled to the optical cavity by a first optical coupling strength. The second light guide has a supply port and an output port, and is optically coupled to the optical cavity by a second optical coupling strength. The first optical coupling strength is greater or stronger than the second optical coupling strength. The second light guide and the optical cavity cooperate to form a filter for light flowing from the supply port to the output port. The first coupling strength is selected such that a first optical signal on the first light guide having a first strength causes a first shift in the filter stop band such that a first wavelength is within the filter stop band. The second coupling strength is selected such that a second optical signal on the second light guide having the first strength causes a second or no shift in the filter stop band, such that the first wavelength is outside of the filter stop band.

It can therefore be seen that the first light guide may be used as a gate or control terminal that affects attenuation of the first wavelength of a light signal on the second light guide. In some embodiments, the optical cavity is an optical resonator having a resonance wavelength that corresponds to the filter stop band.

The above-described features and advantages, as well as others, will become more readily apparent to those of ordinary skill in the art by reference to the following detailed descriptions and accompanying drawings.

DETAILED DESCRIPTION

Figure 1:
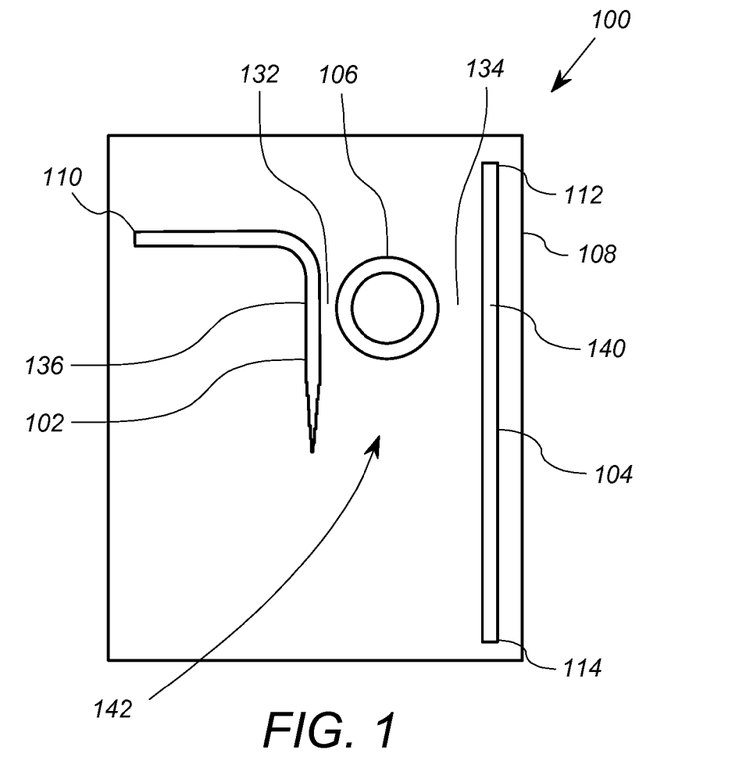
FIG. 1 shows a schematic diagram of an exemplary optical transistor device according to a first embodiment of the invention.

FIG. 1 shows a schematic diagram of an exemplary optical transistor device 100 according to a first embodiment of the invention. The optical transistor device 100 is an optical device that includes a first light guide in the form of a first waveguide 102, a second light guide in the form of a waveguide 104 and an optical cavity in the form of a first micro-ring resonator 106. In general, the optical transistor device 100 in this embodiment is formed as a silicon-on-insulator (SOI) device on a $SiO_2$ substrate 108. The waveguides 102, 104 and the micro-ring resonator 106 are formed in the single crystal silicon layer. Further details regarding the fabrication of the optical transistor device 100 are provided below in connection with FIG. 5.

The micro-ring resonator 106 is configured to resonate light at a resonant frequency as is known in the art. The first micro-ring resonator 106 in this embodiment is formed as single crystal silicon is disposed between the first waveguide 102 and the second waveguide 104, and is in the form of an annulus having a radius of 5 μm. The micro-ring 106, the first waveguide 102 and the second waveguide 104 are substantially coplanar, all formed in the silicon layer of the SOI substrate 108. The annulus of the micro-ring 106 is formed by a circular waveguide having cross-sectional width of 500 nm and a cross sectional height of 250 nm.

It will be appreciated that in other embodiments, the first micro-ring resonator 106 may be replaced by other forms of light cavities that are formed on the semiconductor substrate 108 and are configured to store light and increase an electrical field in a localized region. To this end, the micro-ring resonator 106 may suitably be replaced by another resonator, such as a waveguide in the shape of a racetrack and the like. Alternatively, the micro-ring resonator 106 may be replaced by an optical trap, such as that formed by a photonic crystal.

Each of the first waveguide 102 and the second waveguide 104 is a length of waveguide formed on the semiconductor substrate 108. The waveguides 102, 104 can be replaced however, by other devices that allow light to travel through it. The waveguides 102, 104 may suitably be any optical waveguide such as a wire waveguide, rib waveguide, tapered fibers or the like. In the embodiment described herein, however, the waveguides 102, 104 are waveguides formed of single crystal silicon on top of a $SiO_2$ substrate 108.

The first waveguide 102 has an input port 110 that forms the input port of the device 100. The input port 110 has a coupling for receiving optical signals from a source, such as an optical circuit, not shown in FIG. 1. To this end, the input port 110 may suitably comprise a diffraction grating. The first waveguide 102 is optically coupled to the first micro-ring resonator 106 by a first coupling strength. To this end, the first waveguide 102 is separated from the first micro-ring resonator 106 at its closest point 136 by a first gap 132 having a first gap width G1.

The second waveguide 104 is a length of waveguide having a supply port 112 on one end and an output port 114 on the other end. Each of the supply port 112 and the output port 114 may suitably comprise a diffraction grating. The supply port 112 is configured to be coupled to a source of light signals, such as an optical circuit, not shown in FIG. 1. The output port 114 forms the output of the device 100, and is configured to be coupled to provide optical signals (as controlled by signals at the input port 110) to an optical circuit, not shown in FIG. 1. In addition, the second waveguide 104 is optically coupled to the micro-ring resonator 106 by a second coupling strength. To this end, the second waveguide 104 is separated from the micro-ring resonator 106 at its closed point 140 by a second gap 30 having a second gap width G2.

In general, the waveguides 102, 104 (or alternative light guides) and the micro-ring resonator 106 (or alternative light cavity or trap) are arranged such that the first coupling strength is greater than the second coupling strength. As will be discussed below, it is this relationship of coupling strengths that facilitates transistor-like operation of the optical device 100.

In this embodiment, the waveguides 102, 104 and the micro-ring resonator 106 have the similar dimensions. Each of the first and second waveguides 102, 104, like the micro-ring resonator 106, has a cross-sectional width of 500 nm, and a cross-sectional thickness (or height) of 250 nm. Because the waveguides 102, 104 and micro-ring resonator 106 are formed of single crystal silicon, the optical component 100 may readily be fabricated using CMOS techniques on a silicon-on-insulator (SOI) substrate.

To achieve the relative coupling strengths described above, the gap width G1 (between the first waveguide 102 and the micro-ring resonator 106 is smaller than the gap width G2 between the second waveguide 104 and the micro-ring resonator 106. In this embodiment, the distance G1 is 400 nm and the distance G2 is 450 nm.

In general, the second waveguide 104 and the micro-ring 106 are designed such that they form a filter 142 having a nominal stop band and a pass band. The nominal pass band does not include a first wavelength of interest, $\lambda_0$. By "nominal" it is meant that the second waveguide 104 and/or micro-ring 106 are not subject to any conditions or effects (e.g. heat) that cause a shift in the frequency response thereof. To this end, it will be appreciated that when a micro-ring such as the micro-ring resonator 106 is subjected to a relatively strong signal, thermo-optic effects, (or other effects such as free carrier effects, kerr effects, two photon absorption, etc.) it can cause a redshift in the resonant wavelength of the micro-ring. Accordingly, the "nominal" stop band and pass band of the filter 142 means the stop band and pass band of the filter 142 when the micro-ring resonator 106 is not undergoing appreciable redshift or blueshift due to such effects.

This phenomenon is known in add-drop filters ("ADFs") and notch filters in the general form of an optical micro-ring coupled to at least one waveguide. Accordingly, in the absence of any signal on the first waveguide 102, the optical device 100 effectively allows the first wavelength $\lambda_0$ to pass from the supply port 112 to the output port 114 with little or no attenuation. However, when a light signal of sufficient power is applied to the first port 110 of the first waveguide 102, the resonance wavelength of the micro-ring 106 changes, thereby changing the stop band of the filter 142 formed by the second waveguide 104 and the micro-ring 106. The stop band under such conditions includes the first wavelength $\lambda_0$. Accordingly, when a signal is present on the first port 110, then an optical signal at a second wavelength on the second waveguide 104 is blocked.

Figure 2:
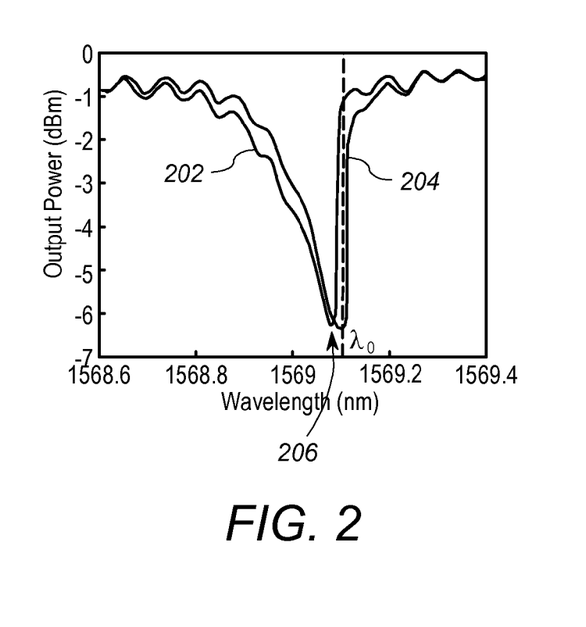
FIG. 2 shows a graph of wavelength response curves of the optical transistor device of FIG. 1 under different input and/or control conditions.

FIG. 2, discussed further below, shows the wavelength response curves 202, 204 of the filter 142, or in other words, the response $P_{out}/P_{in}$ (the optical power at the output port 114 as a function of optical power at the supply port 112). The response curve 202 represents the nominal response of the filter 142, with a stop band 206 that does not include a first frequency $\lambda_0$, and a pass band generally including frequencies outside of the stop band 206. The response curve 204 represents the response of the filter 142 when the micro-ring resonator 106 is subjected to a redshift of its resonant wavelength due to thermo-optic effects or some other effect.

Referring back to FIG. 1, the optical device 100 operates as an inverting switching element (similar to an electrical transistor), at least with respect to the first wavelength $\lambda_0$. In particular, the optical device 100 will pass (to a much greater extent) signals at the second wavelength to the output port 114 in the absence of an optical signal at the first port 110, and will attenuate (or not pass) signals at the second wavelength in the presence of an optical signal at the first port 110.

Referring again to FIG. 2, the wavelength response curve 202 shows the response $P_{out}/P_{in}$ when no (or a low magnitude) optical signal is present at the first port 110. The wavelength response curve 204 shows the response $P_{out}/P_{in}$ when an optical signal of sufficient magnitude is present at the first port 110. As can be seen in FIG. 2, the stop band 206 of the wavelength response curve 202 is adjacent to, but does not include, a wavelength of interest $\lambda_0$=1569.105 nm. Accordingly, when no optical signal is present at the first port 110, the optical device 100 passes signals at the wavelength $\lambda_0$ through from the supply port 112 to the output port 114 at a signal level of approximately −1.0 dB. As also shown in FIG. 2, the stop band 206 of the wavelength response curve 204 includes the wavelength $\lambda_0$=1569.105 nm. Accordingly, when an optical signal of sufficient strength (−6.4 dB or greater) is present at the first port 110, the optical device 100 passes the wavelength $\lambda_0$ at a much more attenuated level of less than −6 dB. Accordingly, as can be seen in FIG. 2, the output on/off ratio is 4.9-5.0 dB in the case of the embodiment described herein.

Moreover, it has also been determined that the above embodiment of the optical device 100 demonstrates a supply to gate ratio (SGR) of approximates −5.85 dB. The SGR is a measure of the ability of a weak gate signal, which is the optical signal at the first port 110, to control a strong supply signal, which is the signal provided to the supply port 112. An SGR of −5.85 dB means that the gate signal (the signal at the first port 110) may control or switch an optical signal at the supply (supply port 112) that is 5.85 dB stronger. Such an SGR allows for the possibility of use of the optical device 100 as a repeater for optical pulse signals, whereby a weaker pulse signal is strengthened by passing it through the first port 110, with a corresponding (but inverted) signal 5.85 dB stronger being supplied at the supply port 112 of the second waveguide 104. In such a case, the output signal at the output port 114, at least in the wavelength of interest, has a much higher strength (although it is inverted) than the input signal. It is clear, as well, that multiple of the optical devices such as the optical device 100 may be cascaded to achieve even greater amplification.

An issue that may arise in some cases is that the relative low on/off ratio (4.9 dB) of the device 100 may not be appropriate for some optical applications. Optical signal devices have the unique requirements that are different from their electrical counterparts—namely—the OFF state should have extremely low transmission power. The difference arises from the fact that voltages in digital electronics does not add, while in optics, power from multiple low optical signals can add up. For example, two outputs of 0.5 volts will equal 0.5 volts in electronics. For optics, on the other hand, if the OFF states has −3 dB transmission power, then adding two OFF state transistors will become an ON state. Such a result can undesirably lead to logic where by 0+0=1.

Accordingly, in order for standard logic addition to function, the OFF state must be much lower than the on/off threshold, preferably around −20 dB or 1%. This would allow the AND operation for a reasonable number of inputs, for example, 10 or 20, to remain logically the value of "0" in response to the corresponding inputs.

To this end, a second optical device according to the invention includes, in addition to the components of FIG. 1, a tunable notch filter optically coupled to the second waveguide (e.g. waveguide 104) that may be used to increase the on/off ratio.

Figure 3:
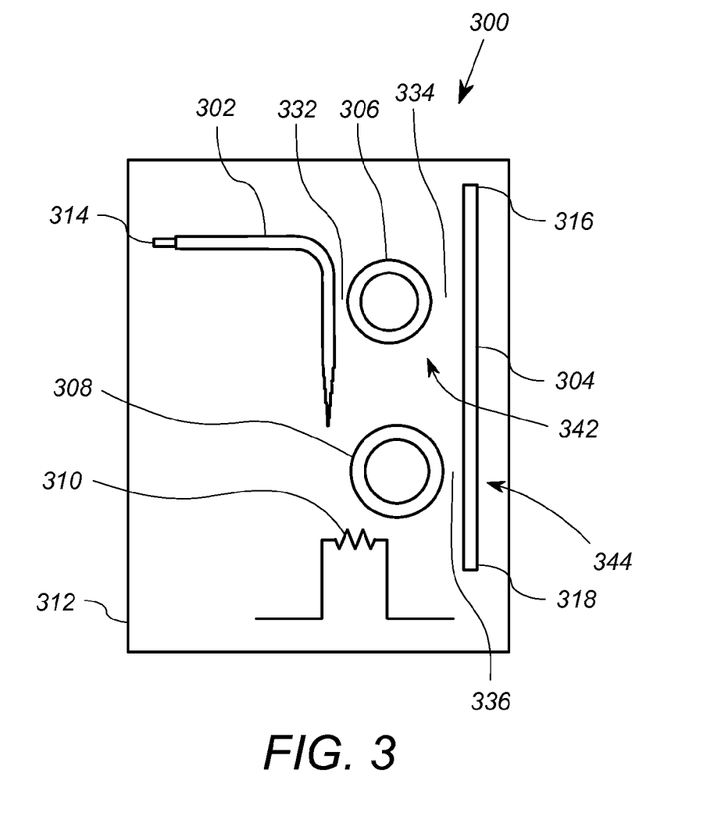
FIG. 3 shows a schematic diagram of an exemplary optical transistor device according to a second embodiment of the invention.

Referring to FIG. 3, the second optical device is in the form of another embodiment of an optical transistor device 300. The optical transistor device 300 includes a first light guide in the form of a waveguide 302, a second light guide in the form of a waveguide 304, a first optical cavity in the form of a micro-ring resonator 306, a second optical cavity in the form of a micro-ring resonator 308, and a micro-heater 310. As with the optical transistor device 100, the optical transistor device 300 may suitably be formed from a silicon-on-insulator (SOI) substrate 312. As also with the optical transistor device 100, the waveguides 302, 304 may take any suitable format discussed above. Similarly, the optical cavities may, instead of being formed as the micro-ring resonators 306, 308, be formed as racetracks, discs, toroids or instead replaced by optical traps. Further details regarding the fabrication of the optical transistor device 300 are provided below in connection with FIG. 5.

In this embodiment, each of the first waveguide 302 and the second waveguide 304 has a width of 500 nm and a depth, thickness or height of 250 nm. The first waveguide 302 has first port 314 at which control light signals may be received. The second waveguide 304 has a supply port 316 and an output port 318. Each of the ports 314, 316 and 318 may suitably be or include a diffraction grating.

The first micro-ring 306 is disposed between the first waveguide 302 and the second waveguide 304, and is in the form of an annulus having a radius of 5 μm. The annulus is formed by a circular waveguide having cross-sectional width of 500 nm and a cross sectional height of 250 nm. The second micro-ring 308 is disposed adjacent to the second waveguide 304 and further spaced apart from the first waveguide 302. As will be discussed below, the second micro-ring 308 may suitably have a structure similar to that of the first micro-ring resonator 306.

The first micro-ring resonator 306 is optically coupled to the first waveguide 302 by a first coupling strength, and is optically coupled to the second waveguide 304 by a second coupling strength. Similar to the embodiment of FIG. 1, the first coupling strength is greater than the second coupling strength.

To achieve these coupling strengths, the first waveguide 302 at its closest point is separated from the first micro-ring resonator 306 by a first gap 332 having a first gap width G1, and the second waveguide 304 is separated from the first micro-ring resonator 306 by a second gap 334 having a second gap width G2. The distance G1 is smaller than the distance G2. In this embodiment, the distance G1 is 400 nm and the distance G2 is 450 nm. Accordingly, the first waveguide 302, the second waveguide 304 and the first micro-ring resonator 306 may suitably be substantially identical in structure and interrelationship as the waveguides 102, 104 and resonator 106 of FIG. 1.

Accordingly, the second waveguide 304 and the resonator 306 cooperate to form a first filter 342 having a pass band and a stop band, similar to the filter 142 of FIG. 1. The stop band (and hence the pass band) of the filter 342 are defined at least in part by the resonant wavelength of the first micro-ring 306. The resonant wavelength of the first micro-ring 306 is defined by its radius. In particular, the size of the first micro-ring 306 is selected to have the quality of having a nominal (non-shifted) resonance wavelength that is adjacent to, but not including, a wavelength of interest $\lambda_0$, i.e., the wavelength for which the device 300 will be used as a transistor-type element. The resonance wavelength should further be such that an optical signal on the first waveguide 302 of a moderate or relatively weak signal level can cause a red-shift in the resonance wavelength of the micro-ring 306 to approximately the wavelength of interest $\lambda_0$. In other words, the radius of the micro-ring 306 should be chosen such that it does not significantly attenuate the wavelength $\lambda_0$ of a signal on the second waveguide 304 when operating "cold", but does attenuate the wavelength $\lambda_0$ when operating "hot" due to a strong resonating signal.

As discussed above, the device 300 of FIG. 3 differs from the device 100 of FIG. 1 in part because it includes a second micro-ring 308. The second micro-ring 308 is disposed adjacent to the second waveguide 304. In general, the second micro-ring 308 is optically coupled to the second waveguide 304 by third coupling strength. In the embodiment of FIG. 3, the third coupling strength is greater than the second coupling strength between the second waveguide 304 and the first micro-ring 306.

In particular, like the first micro-ring 306, is in the form of an annulus having a radius of approximately 5 μm. Also like the first micro-ring 306, the annulus is formed by a circular waveguide having cross-sectional width of 500 nm and a cross sectional height of 250 nm. The second micro-ring 308 is not adjacent to, or at least not in an optical coupling relationship with, the first waveguide 302. To achieve the third coupling strength in this embodiment, the second waveguide 304 at its closest point is separated from the second micro-ring 308 by third gap 336 having a third gap width G3. The distance G3 is less than the distance G2 between the second waveguide 304 and the first micro-ring 306, and preferably slightly less than the distance G1 between the first waveguide 302 and the first micro-ring 306. In this embodiment, the distance G3 is approximately 380 nm.

The second micro-ring 308 and the second waveguide 304 form a notch filter 344. The radius of the second micro-ring 308 should be selected such that its nominal resonant wavelength includes the wavelength of interest $\lambda_O$, such that the wavelength $\lambda_O$ is in the stop band of the resulting notch filter 344. However, the radius is further selected such that under the conditions of being heated by a resonating signal, the resonant wavelength red-shifts such that the wavelength $\lambda_O$ falls outside the stop band. The resonating signal that causes such a shift should correspond to the optical coupling from the second waveguide 304 of a signal having the approximate strength of the supply signal provided at the supply port 316.

Thus, while the second micro-ring 308 has a radius and nominal resonant wavelength similar to that of the first micro-ring 306, they will be slightly different. The first micro-ring 306 operating cold will not appreciably attenuate the wavelength $\lambda_O$, while the second micro-ring 308 operating cold will attenuate the wavelength $\lambda_O$.

It will be appreciated that it is not always possible or at least economically feasible to precisely formulate the second micro-ring 308 to be matched to the first micro-ring 306 for the wavelength of interest $\lambda_O$. Accordingly, in this embodiment the micro-heater 310 is included to help tune the second micro-ring 308. The micro-heater 310 is selectively actuated to heat the second micro-ring 308 to slightly red-shift its resonant wavelength as necessary to fulfill the conditions identified above. It will be appreciated that in some embodiments, a separate micro-heater may be added, if necessary, to also tune the first micro-ring 306 to a desired wavelength of interest.

Referring again to the embodiment of FIG. 3, the micro-heater 310 is preferably a titanium conductive trace or contact on the surface of the substrate 312 that extends in thermal proximity to the second micro-ring 308. The micro-heater 310 can be used to thermally tune the second micro-ring 308 to the wavelength of interest $\lambda_O$. Use of micro-heaters to tune a micro-ring of a notch filter or ADF to a desired frequency would be known to one of ordinary skill in the art.

In operation, the optical device 300 may be used in optical circuit, not shown, whereby a first optical signal is used to control a second optical signal at the output port 318. In general, a first optical signal with reference power 0 dB is provided as the supply signal at the supply port 316. The supply signal includes, among other things, a wavelength of interest $\lambda_O$. In addition, current is applied to the micro-heater 310 at a level that causes, via thermal-optical effects, the second micro-ring 308 to have a resonant wavelength that includes the wavelength of interest $\lambda_O$. Under such conditions, the signal at the output port 318 is a function of the optical signal at the first port 314 as will be discussed below.

In a first input signal condition, no input signal is provided at the first port 314. When no optical signal is provided to the first port 314, the supply signal propagates from the supply port 316 to the output port 318 along the second waveguide 304. When the supply signal propagates past the first micro-ring 306, the first micro-ring 306 acts upon the signal to provide filtering, wherein one or more frequencies in a stop band are significantly attenuated. However, the wavelength of interest $\lambda_O$ is not in the stop band. Accordingly, the first micro-ring 306 does not significantly attenuate the wavelength $\lambda_O$. In addition, because of the relatively large gap G2 between the second waveguide 304 and the first micro-ring 302, even the relatively strong supply signal on the second waveguide 304 does not cause appreciable red-shift in the first micro-ring 306.

When the relatively strong optical signal propagates to the second micro-ring 308, however, the strong coupling (G3<G2) of the relatively strong signal causes additional heating of the second micro-ring 308. This additional heating of the second micro-ring 308 causes the resonant wavelength of the second micro-ring 308 to shift such that the wavelength of interest $\lambda_O$ is not within the stop band. As a consequence, the second micro-ring 308 does not attenuate the wavelength of interest $\lambda_O$ on the second waveguide 304 by an appreciable amount.

As a consequence, when no optical signal is present at the first port 314, neither the first micro-ring 306 nor the second micro-ring 308 operate to attenuate the wavelength of interest $\lambda_O$ by a substantial amount, although there is some normal attenuation. Accordingly, the output signal at the output port 318 includes the wavelength $\lambda_O$ in a largely unattenuated, or only moderately attenuated, state. In the embodiment described herein, the output signal 318 is attenuated at a signal strength of −4.0 dB to −6.0 dB with respect to the supply signal at the supply port 316.

Under a second input signal condition, an input signal is provided at the first port 314. The input signal in this embodiment has a strength of at least about −5.0 dB compared to the supply signal at the supply port 316. The input optical signal, however, is coupled into the first micro-ring 306, via the optical coupling at the first gap 332. Because of the relatively small gap distance G1, the input optical signal is coupled into the first micro-ring 306 at a sufficient strength to cause red-shifting of the resonant wavelength of the first micro-ring 306. Specifically, the red-shift causes the resonant wavelength to shift such that the wavelength of interest $\lambda_O$ falls within the stop band of the filter formed in part by the first micro-ring 306.

In addition, the supply signal propagates from the supply port 316 toward the output port 318 along the second waveguide 304. As discussed above, the filter 342 formed by the first micro-ring 306 and the second waveguide 304 operate to significantly attenuate one or more frequencies in the stop band. Because the wavelength of interest $\lambda_O$ has been red-shifted into the stop band of the filter 342, the first micro-ring 306 provides at least about 5 dB attenuation to the wavelength $\lambda_O$.

When the attenuated supply signal propagates to (and is coupled into) the second micro-ring 308, it does not have sufficient strength to create substantial additional heating of the second micro-ring 308. As a consequence, the resonant wavelength of the second micro-ring 308 does not shift significantly, and the wavelength of interest $\lambda_O$ remains within the stop band of the notch filter 344. As a consequence, the notch filter 344 formed by the second micro-ring 308 and the second waveguide 304 provides even further attenuation to the signal on the second waveguide 304.

As a consequence, when a sufficiently strong optical signal is present at the first port 314, both the first micro-ring 306 and the second micro-ring 308 operate to attenuate the wavelength of interest $\lambda_O$. Accordingly, the output signal at the output port 318 includes the wavelength $\lambda_O$ in a significantly attenuated state, for example, at a signal strength of −25.0 dB with respect to the supply signal at the supply port 316.

Thus, the optical device 300 provides an even better on/off ratio than that of the first optical device 100. In this embodiment, the on/off ratio is approximate −5 dB/−25 dB or approximate 20 dB. As with the optical device 100, the SGR ratio may be further improved by cascading devices, for example, connecting the output port 318 of a first device 300 to the first port 314 of a second device 300.

Figure 4:
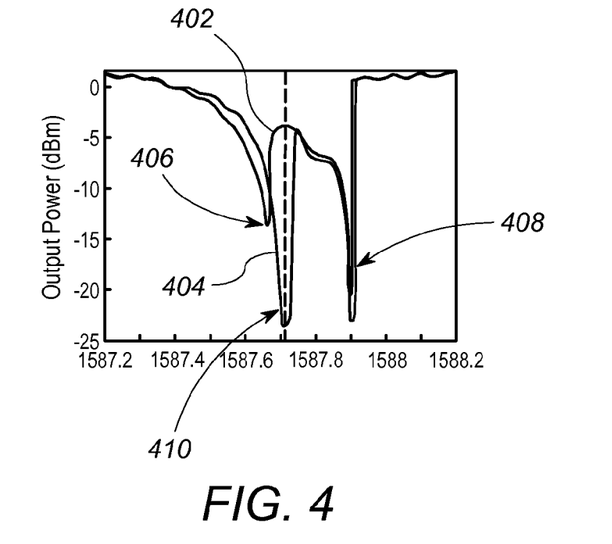
FIG. 4 shows a graph of wavelength response curves of the optical transistor device of FIG. 3 under different input and/or control conditions.

FIG. 4 shows wavelength response plots 402, 404 of signals $P_{out}$ measured at the output port 318 for identical signals $P_{in}$ provided at the supply port 316. The wavelength response plot 402 shows the response $P_{out}/P_{in}$ when no (or a low magnitude) optical signal is present at the first port 314. The wavelength response plot 404 shows the response $P_{out}/P_{in}$ when an optical signal of sufficient magnitude is present at the first port 314. As can be seen in FIG. 4, a stop band 406 of the wavelength response curve 402 is adjacent to, but does not include, a wavelength $\lambda_0$. It will be appreciated that another stop band 408 of the device 300 similarly does not include the wavelength of interest $\lambda_0$. Accordingly, when no optical signal is present at the first port 314, the optical device 300 passes signals at the wavelength $\lambda_0$ through from the supply port 316 to the output port 318. As also shown in FIG. 4, the stop band 410 of the wavelength response curve 404 includes the wavelength $\lambda_0$. Accordingly, when an optical signal of sufficient strength is present at the first port 314, the optical device 300 passes the wavelength $\lambda_0$ at a much more attenuated level. As can be seen in FIG. 4, the output on/off ratio is approximately 20 dB in the case of the embodiment described herein.

The optical devices 100 and 300 thus provide the characteristics of an electrical transistor in an optical circuit, and may be carried out on a silicon chip, for example, on an SOI substrate.

Figure 5:
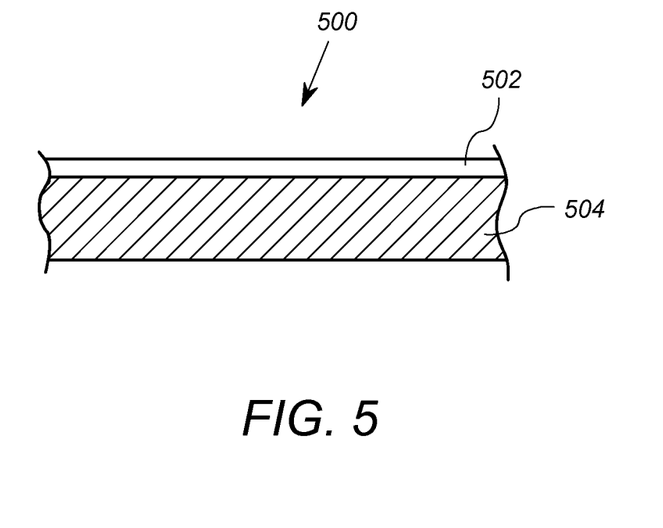
FIG. 5 shows a cutaway side view of a silicon-on-insulator ("SOI") substrate on which the optical transistors of FIGS. 1 and 3 may be fabricated.

The fabrication of the optical devices 100, 300 may suitably be carried out using traditional CMOS operations on an SOI substrate. FIG. 5 shows a side cutaway view of an SOI substrate 500 in which the optical devices may be formed. The SOI substrate 500 includes an silicon layer 502 of 250 nm on top of a buried oxide substrate 504. In general, the waveguides 102, 104, 302, 304 and the micro rings 106, 306 and 308 are formed from the silicon layer 502. To this end, the device gratings for the optical couplings (on opposing sides of the gaps 132, 134, 332, 334, 336 are patterned using a high resolution electron-beam lithography, preferably with a device operable to provide a beam step size of 2 nm. The waveguides 102, 104, 302, 304 and the micro rings 106, 306 and 308 are formed from the silicon layer 502 using a similar technique. Both etching steps may suitably be carried out using reactive-ion etching with $Cl_2/Ar$. In the case of the device 300, the micro-heater 310, which is formed of titanium, may be evaporated onto the substrate next to the micro-ring 308.

As discussed above, the optical device 300 of FIG. 3 may perform operations in optical circuits similar to that of a transistor in electrical circuits. Moreover, because the optical device 300 is formed from components on semiconductor substrate 312, the optical device 300 may be employed in an integrated circuit that includes both electrical circuit components and digital circuit components.

Figure 6:
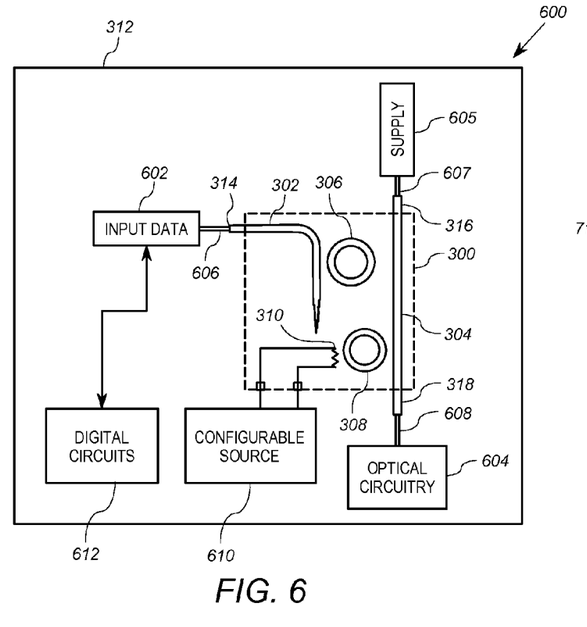
FIG. 6 shows a schematic block diagram of an exemplary optical circuit that includes the optical transistor device of FIGS. 3.

FIG. 6, for example, shows a schematic diagram of the device 300 employed in an integrated circuit 600 formed on the semiconductor substrate that includes optical circuit components and electrical circuit components. The optical circuit components include a first optical circuit portion 602 and a second optical circuit portion 604, and a light supply 605 with the optical device 300 optically coupled therebetween. To this end, each of the first optical circuit portion 602 and the second optical circuit portion 604 includes one or more optical components that carry out functions, for example, in transmitting and/or otherwise manipulating data signals. By way of example, the circuit 600 may be an inverting optical repeater in which data signals from the first optical circuit portion 602 are amplified for further transmission or further processing by the second optical circuit portion 604. In such an embodiment, the first optical circuit power 602 may be a source of data signals requiring amplification, and the second optical circuit portion 604 may be a transmission medium or circuit that processes the data signals. In addition, the light supply 605 is a source of a steady state optical signal, analogous to bias DC voltage at the collector or drain of an electrical transistor device.

The first optical circuit portion 602 includes a first port 606 operably coupled to the input port 314 of the optical device 300, and the second optical circuit portion 604 includes a second port 608 operably coupled to the output port 318 of the optical device 300. The steady state optical signal supply or light supply 605 has a third port 607 that is operably coupled to the supply input 316 of the optical device 300.

In this embodiment, the optical circuit 600 is configured to invert and amplify binary signals (for example, logic high and logic low signals) received at the first optical circuit portion 602, and provided the inverted and amplified signals for further processing or transmission via the second optical circuit portion 604. One the purposes of a repeater circuit is to increase the on/off ratio of the logic high and logic low signals. To this end, the optical power of the signal receive from the light supply 605 will exceed that of the maximum optical power of the light signal (at least in the wavelength of interest) received from the first optical circuit portion 602. Thus, the output signal provided to the second optical circuit portion 604 can have a greater on/off ratio (between logic high and logic low signals) than those received from the first optical circuit portion 602.

The electrical components of the integrated circuit 600 of FIG. 6 include the micro-heater 310, a configurable electrical source 610, and digital circuits 612. The configurable electrical source 610 is a circuit configured to provide an electrical current across the micro-heater 310. The current is sufficient to cause the micro-heater 310 to heat the second micro-ring 308 as necessary to achieve the proper resonant wavelength as discussed above. The configurable electrical source 610 is configurable to provide the specific amount of current necessary to adjust the resonant wavelength of the second micro-ring 308 based on any manufacturing variances in the first and second micro-rings 306, 308.

The digital circuits 612 and electrical digital circuits which in some embodiments may suitably comprises a microprocessor, memory circuits and the like. Such digital circuits 612 are operably connected to provide digital signals to the first optical circuit portion 602. Suitable means for converting between electrical digital signals and optical signals are known in the art, and may form part of the first optical circuit portion 602.

It will be appreciated that while the first optical circuit portion 602, the second optical circuit portion 604, the light source 605 and the electrical source 610 may all or in part be disposed on the substrate 312, not shown in FIG. 6, or may be selectively disposed on other substrates or in other structures.

Figure 7:
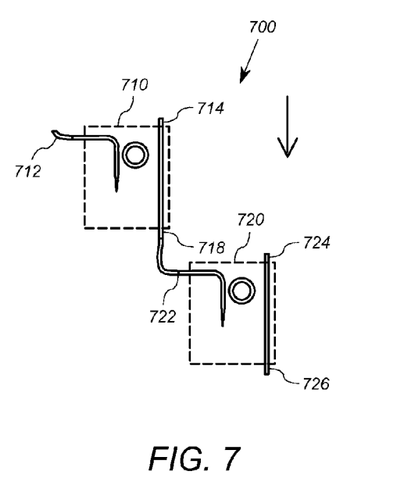
FIG. 7 shows a schematic diagram of an arrangement of cascaded optical transistor devices according to an embodiment of the invention.

It will further be appreciated that any of the optical transistor devices described herein may also be combined in cascaded fashion to achieve greater on/off discrimination, greater amplification, and/or to remove inversion effects. FIG. 7 shows an exemplary arrangement 700 of two optical devices 710, 720 arranged in cascaded format. The first optical device 710 has an input port 712, a supply port 714 and an output port 716, and the second optical device 720 has an input port 722, a supply port 724 and an output port 726. The optical devices 710, 720 in this example may suitably have an architecture substantially similar to that of the optical device 100 of FIG. 1. However, it will be appreciated that the either or both of the optical devices 710, 720 in other embodiments may employ the design of the optical device 300 of FIG. 3.

In any event, the input port 712 to the first optical device 710 forms the input to the arrangement 700, and the output port 726 of the second optical device 720 forms the output of the arrangement 700. The output port 716 of the first optical device 710 is coupled directly to the input port 722 of the second optical device 720. Typically, the supply ports 714, 724 will be coupled to different light sources of different strengths.

Because each optical device 710, 720 provides amplification and inversion, and the cascade arrangement 700 can provide output signals with a greater on/off ratio than that which could be performed by a single optical device alone. Moreover, because the number of cascaded optical devices 710, 720 is even, the output optical signals are non-inverted with respect to the input optical signals. It will be appreciated that the number of cascaded optical devices can vary as necessary or desired.

It will also be appreciated that while the exemplary embodiments described herein employed gap widths G1, G2 and G3 are in the range of approximately 300 nm to 500 nm, different optical devices 100, 300 with different requirements or materials may employ gaps ranging from 10 nm to 10 μm. Furthermore, it will be appreciated that while the various coupling strengths (e.g. between the waveguides 102, 104 and the micro-ring resonator 106) discussed above in this embodiment have been achieved by varying the gap widths, another way to achieve different coupling strengths as describe above is to employ different effective refractive indices of the waveguides (with or without changing the gap), or to employ different refractive indices of the micro-rings at locations near the waveguides.

For example, employing different refractive indices in the optical device 100 may be carried out by changing the physical dimensions of the waveguides 102, 104 at points 136, 140, or changing the physical dimensions of the micro-rings 106 adjacent to the gaps 132, 134. The different refractive indices of the waveguides 102, 104 and/or the micro-ring 106 near the gaps 132, 134 may also be achieved using different materials having different effective refractive indices, or employing an asymmetric overcladding or undercladding around the gaps 132, 134 to locally change the strength of coupling.

It will also be appreciated that the optical devices 100, 300 can be realized in materials other than silicon. For example, the optical diode 100, 300 can be fabricated using any material that can allow light to be confined in it and manipulated, including other semiconductors such as germanium, gallium arsenide, indium arsenide, oxides like titanium dioxides, silicon nitrides and other high refractive index materials. It will also be appreciated that while FIG. 3 shows a single additional optical cavity (the second micro-ring resonator 308), any number of additional optical cavities could be cascaded onto the system along the second waveguide 304 to increase the efficiency of the performance as long as they all behave in the same manner as the notch filter 344 (when the signal is high, the resonant wavelength of the optical cavity moves away and allows the light to pass, and when the signal is low, it allows the signal to pass).

It will be appreciated that the above described embodiments are merely illustrative, and that those of ordinary skill in the art may readily devise their own implementations and modifications that incorporate the principles of the present invention and fall within the spirit and scope thereof.

We claim:
1. An optical device, comprising:
an optical cavity formed on a semiconductor substrate;
a first light guide formed on the semiconductor substrate and optically coupled to the optical cavity by a first optical coupling strength;
a second light guide formed on the semiconductor substrate, the second light guide having a supply port and an output port, the second light guide optically coupled to the optical cavity by a second optical coupling strength, the first optical coupling strength stronger than the second optical coupling strength, wherein the second light guide and the optical cavity cooperate to form a filter for light flowing from the supply port to the output port, the filter having a stop band; and
wherein the first coupling strength is selected such that a first optical signal on the first light guide having a first strength causes a first shift in the stop band such that a first wavelength is within the stop band, and wherein the second coupling strength is selected such that a second optical signal on the second light guide having the first strength causes a second or no shift in the stop band such that the first wavelength is outside of the stop band.

2. The optical device of claim 1, wherein the first coupling strength is selected such that the optical signal on the first light guide causes an increase in an attenuation of a wavelength component of the second optical signal on the second light guide, the wavelength component including the first wavelength.

3. The optical device of claim 1, wherein the first light guide, the second light guide and the optical cavity are substantially coplanar.

4. The optical device of claim 1, further comprising a second optical cavity optically coupled to the second light guide by a third coupling strength.

5. The optical device of claim 4, wherein the second optical cavity is substantially optically decoupled from the first light guide.

6. The optical device of claim 4, wherein the second light guide and the second optical cavity form a second filter for the light flowing from the supply port to the output port, the second filter having a second filter stop band including the first wavelength, and wherein the third coupling strength is such that the second optical signal on the second light guide having the first strength causes a shift in the second filter stop band such that the first wavelength is outside of the second filter stop band.

7. The optical device of claim 6, wherein the first coupling strength is selected such that the optical signal on the first light guide causes an increase in an attenuation of a wavelength component of the second optical signal on the second waveguide, the wavelength component including the first wavelength, and such that the second signal having said attenuation of the wavelength component causes a second or no shift in the second filter stop band such that the first wavelength is within the second filter stop band.

8. The optical device of claim 1, wherein the optical cavity comprises an optical resonator.

9. The optical device of claim 1, wherein the optical cavity comprises a micro-ring resonator.

10. The optical device of claim 1, wherein the first light guide comprises an optical waveguide.

11. An optical device, comprising:
an optical resonator formed on a semiconductor substrate;
a first optical waveguide formed on the semiconductor substrate and optically coupled to the optical cavity by a first optical coupling strength;

a second optical waveguide formed on the semiconductor substrate, the second light guide having a supply port and an output port, the second optical waveguide optically coupled to the optical resonator by a second optical coupling strength, the first optical coupling strength stronger than the second optical coupling strength, wherein the second optical waveguide and the optical resonator cooperate to form a filter for light flowing from the supply port to the output port, the filter having a stop band; and wherein the first coupling strength is selected such that a first optical signal on the first optical waveguide having a first strength causes a first shift in the stop band such that a first wavelength is within the stop band, and wherein the second coupling strength is selected such that a second optical signal on the second optical waveguide having the first strength causes a second or no shift in the stop band such that the first wavelength is outside of the stop band.

12. The optical device of claim 11, wherein the first coupling strength is selected such that the optical signal on the first optical waveguide causes an increase in an attenuation of a wavelength component of the second optical signal on the second optical waveguide, the wavelength component including the first wavelength.

13. The optical device of claim 12, wherein first optical waveguide is separated from the optical resonator by a first gap having a first gap width, and the second optical waveguide is separated from the optical resonator by a second gap having a second gap width, wherein the second gap width is larger than the first gap width.

14. The optical device of claim 13, wherein the optical resonator comprises an optical micro-ring having a resonant wavelength corresponding to the stop band.

15. The optical device of claim 13, wherein the first optical waveguide, the second optical waveguide and the optical resonator are substantially coplanar.

16. The optical device of claim 15, wherein the first gap width is approximately 400 nm, and wherein the second gap width is approximately 450 nm.

17. The optical device of claim 11, further comprising a second optical resonator optically coupled to the second optical waveguide by a third coupling strength.

18. The optical device of claim 17, wherein the second optical waveguide and the second optical resonator form a second filter having a second filter stop band including the first wavelength, and wherein the third coupling strength is such that the second optical signal on the second waveguide having the first strength causes a shift in the second filter stop band such that the first wavelength is outside of the second filter stop band.

19. The optical device of claim 18, further comprising a micro-heater disposed adjacent to the second optical resonator and further distant from the optical resonator.

20. An integrated circuit, comprising:
a semiconductor substrate;
a plurality of components on said semiconductor substrate; and
an optical device formed on the semiconductor substrate, the optical device comprising
an optical cavity formed on a semiconductor substrate,
a first light guide formed on the semiconductor substrate and optically coupled to the optical cavity by a first optical coupling strength,
a second light guide formed on the semiconductor substrate, the second light guide having a supply port and an output port, the second light guide optically coupled to the optical cavity by a second optical coupling strength, the first optical coupling strength stronger than the second optical coupling strength, wherein the second light guide and the optical cavity cooperate to form a filter for light flowing from the supply port to the output port, the filter having a stop band, and
wherein the first coupling strength is selected such that a first optical signal on the first light guide having a first strength causes a first shift in the stop band such that a first wavelength is within the stop band, and wherein the second coupling strength is selected such that a second optical signal on the second light guide having the first strength causes a second or no shift in the stop band such that the first wavelength is outside of the stop band.

* * * * *